(12) United States Patent
Tanaka

(10) Patent No.: US 7,516,808 B2
(45) Date of Patent: Apr. 14, 2009

(54) SEAT BELT RETRACTOR AND SEAT BELT APPARATUS

(75) Inventor: Koji Tanaka, Tokyo (JP)

(73) Assignee: Takata Corporation, Tokyo (JP)

( * ) Notice: Subject to any disclaimer, the term of this patent is extended or adjusted under 35 U.S.C. 154(b) by 336 days.

(21) Appl. No.: 11/444,427

(22) Filed: Jun. 1, 2006

(65) Prior Publication Data

US 2006/0290131 A1    Dec. 28, 2006

(30) Foreign Application Priority Data

Jun. 27, 2005   (JP)   ............................. 2005-186767

(51) Int. Cl.
*B60R 22/34* (2006.01)
*B65H 75/48* (2006.01)

(52) U.S. Cl. ...................... 180/268; 242/390.8; 280/807
(58) Field of Classification Search ................. 180/268, 180/286; 242/374, 390.8, 390.9; 280/807; 297/474, 475; 701/45

See application file for complete search history.

(56) References Cited

U.S. PATENT DOCUMENTS

| | | | | |
|---|---|---|---|---|
| 2,905,231 A | * | 9/1959 | Olson | 280/807 |
| 3,164,409 A | * | 1/1965 | Rumble | 280/807 |
| 3,764,161 A | * | 10/1973 | Bright et al. | 280/803 |
| 3,973,786 A | * | 8/1976 | Rogers, Jr. | 280/807 |
| 4,007,948 A | * | 2/1977 | Stephenson et al. | 280/807 |
| 4,185,855 A | * | 1/1980 | Salamon | 280/804 |
| 4,320,878 A | * | 3/1982 | Takada | 242/385 |
| 4,458,920 A | * | 7/1984 | Ozaki | 280/801.1 |
| 4,461,493 A | * | 7/1984 | Doty | 280/807 |
| 4,676,444 A | * | 6/1987 | Nishimura et al. | 242/390.8 |
| 4,770,365 A | * | 9/1988 | Takada | 280/807 |
| 4,946,196 A | * | 8/1990 | Doty | 280/803 |
| 5,261,696 A | * | 11/1993 | Hamaue | 280/802 |
| 5,265,823 A | * | 11/1993 | Doty | 242/372 |
| 5,292,153 A | * | 3/1994 | Mishina | 280/807 |
| 6,005,241 A | * | 12/1999 | Doty et al. | 250/222.1 |
| 6,360,981 B1 | | 3/2002 | Specht | |
| 6,374,938 B2 | | 4/2002 | Yano et al. | |
| 6,485,057 B1 | * | 11/2002 | Midorikawa et al. | 280/807 |
| 6,669,234 B2 | * | 12/2003 | Kohlndorfer et al. | 280/801.1 |
| 6,722,698 B2 | * | 4/2004 | Viano et al. | 280/806 |
| 2001/0025735 A1 | * | 10/2001 | Midorikawa et al. | 180/268 |
| 2003/0200019 A1 | * | 10/2003 | Grabowski et al. | 701/45 |

(Continued)

FOREIGN PATENT DOCUMENTS

DE        197 31 689 A1      2/1999

(Continued)

*Primary Examiner*—Faye M. Fleming
*Assistant Examiner*—Laura Freedman
(74) *Attorney, Agent, or Firm*—Foley & Lardner LLP

(57) ABSTRACT

The disclosed seat belt retractor and seat belt apparatus may be used to provide a technology effective for reducing the risk of making a vehicle occupant uncomfortable with regard to the seat belt winding action. A seat belt retractor and seat belt apparatus may comprise an electric motor, a spool capable of winding and unwinding a seat belt for occupant restraint, and a controller configured to perform a control mode in which the electric motor is controlled to rotate in a belt winding direction based on the status of a wearing of the seat belt on a vehicle occupant and the status of a vehicle door corresponding to the seat belt.

14 Claims, 3 Drawing Sheets

U.S. PATENT DOCUMENTS

2005/0154517 A1 7/2005 Tanaka et al.
2006/0065771 A1 3/2006 Takao et al.

FOREIGN PATENT DOCUMENTS

| EP | 1 074 439 A2 | 2/2001 |
| JP | 2000052926 | 2/2000 |
| JP | 2001-253317 | 9/2001 |
| JP | 2002-173000 | 6/2002 |
| JP | 2005-280497 | 10/2005 |
| WO | WO 99/51469 | 10/1999 |

* cited by examiner

SEAT BELT RETRACTOR AND SEAT BELT APPARATUS

BACKGROUND

The present invention relates to a seat belt retractor to be installed in a vehicle.

Conventionally, a seat belt apparatus is known, which is structured to protect an occupant in a vehicle by a seat belt (or webbing) restraining the occupant. For example, Japanese PCT International Application Publication 2003-507252 (the '252 Publication) discloses a structure of a seat belt retractor of a seat belt apparatus in which a spool (or a winding shaft) can be rotated for the winding and unwinding of a seat belt by an electric motor.

The technology described in the '252 Publication proposes a possibility of using an electric motor to conduct the seat belt winding action of the spool in the structure of the seat belt retractor. When this structure is used for the control (or the seat belt storing control) of the winding up of a seat belt in order to prevent the seat belt from being kept in the unwound state, the control is required to prevent making the vehicle occupant uncomfortable as much as possible.

Specifically, if the seat belt storing control employs such a structure that the seat belt winding action is conducted on the condition that the wearing of the seat belt is cancelled by releasing a tongue from a seat belt buckle, the control may make the vehicle occupant uncomfortable when the vehicle occupant releases the tongue from the seat belt buckle to cancel the wearing of the seat belt but changes his or her mind and decides to wear the seat belt again. In this case, the vehicle occupant must withdraw the seat belt against the winding force of the seat belt winding action, thus causing discomfort.

Therefore, the present disclosure has been made in view of the above problem and it is an object of the present application to provide a technology which relates to a seat belt winding action using an electric motor for preventing the seat belt from being kept in the unwound state and which is effective for reducing the risk of making the vehicle occupant uncomfortable.

For achieving the object, the present application is made. The present disclosure can be typically adapted to a seat belt retractor to be installed in an automobile. In addition, the present disclosure can be adapted to a technology for developing a seat belt retractor to be installed in a vehicle other than the automobile, such as an aircraft, a boat, a train, or a bus.

SUMMARY

The first embodiment of the present invention can be a seat belt retractor. The seat belt retractor can be a device to be installed in a vehicle and may comprise at least an electric motor, a spool, and a controller. The spool may be capable of winding and unwinding the seat belt for occupant restraint according to the driving of the electric motor. The controller for controlling the electric motor may perform a control mode in which the electric motor is controlled to rotate in a belt winding direction on the condition that the wearing of the seat belt on a vehicle occupant is cancelled and a vehicle door corresponding to the seat belt is changed from a closed state to an open state The spool can be a member which is operated according to the driving of the electric motor to wind or unwind a seat belt for occupant restraint. The seat belt capable of being wound onto and unwound from the spool is a long belt to be worn by a vehicle occupant seated in a seat and is sometimes called a "webbing." Typically, the vehicle occupant seated in the vehicle seat is restrained by the seat belt when restraint is required, such as during a vehicle collision. In the present invention, if required, a power transmission mechanism may be suitably disposed between the electric motor and the spool to selectively achieve a connected state where the electric motor and the spool are connected and a disconnected state where the connected state is cancelled. The seat belt winding action by the spool may be conducted only by the driving force of the electric motor or by the winding force of an elastic member, such as a return spring which acts on the spool, with the electric motor being a secondary driving force.

The controller can be adapted at least as a means for controlling the driving of the electric motor and can control the driving direction, the driving time, and the output of the electric motor. The controller may typically comprise a CPU (central processing unit), an input/output unit, a storage unit, a peripheral unit, and the like. The controller may be provided exclusively for the seat belt retractor or may also be used for controlling other systems, such as a driving system and/or an electric system.

It should be noted that if a seat belt is kept in a state withdrawn from a spool in a seat belt retractor of this kind, there is a risk that trouble will occur in which the seat belt itself or a tongue attached to the seat belt is caught by the vehicle door. In order to prevent such trouble, the seat belt retractor can have such a structure as to conduct the seat belt winding action (or the seat belt storing action) for actively winding the withdrawn seat belt onto the spool using an electric motor. The structure may be adapted such that the seat belt winding action (the seat belt storing action) is conducted directly on the condition that the wearing of the seat belt on the vehicle occupant is cancelled. However, this structure makes the vehicle occupant uncomfortable when the vehicle occupant cancels the wearing of the seat belt but changes his or her mind and decides to wear the seat belt again. In this case, the vehicle occupant is needed to withdraw the seat belt against the winding force of the seat belt winding action so as to experience discomfort.

Accordingly, the controller may perform a control mode in which the electric motor is controlled to rotate in the belt winding direction directly on the condition that the wearing of the seat belt on a vehicle occupant is cancelled and a vehicle door corresponding to the seat belt is changed from the closed state to the open state. Specifically, when it is detected that the vehicle door is changed from the closed state to the open state, the controller outputs a control signal to the electric motor to drive the electric motor in the belt winding direction. If not, the controller does not drive the electric motor or stops the output of the driving control signal. In case the seat belt retractor comprises a power transmission mechanism which is disposed between the electric motor and the spool and is capable of switching between a connected state and a disconnected state, the controller may perform as follows. When it is detected that the vehicle door is changed from the closed state to the open state, the controller sets the power transmission mechanism in the connected state and outputs a control signal to the electric motor to drive the electric motor to rotate in the belt winding direction. If not, the controller sets the power transmission mechanism in the disconnected state or does not drive the electric motor (or stops the output of the driving control signal). The electric motor is controlled to rotate in the belt winding direction, thereby preventing the seat belt from being kept in the unwound state.

The determination of whether or not the seat belt winding action (the seat belt storing action) is conducted is directly based on the information of whether or not the vehicle door is changed from the closed state to the open state after canceling the wearing of the seat belt, is not based on the information of whether or not the vehicle occupant cancels the wearing of the seat belt. This concept is grounded in the idea that the vehicle occupant is highly likely to withdraw the seat belt in order to wear the seat belt again when the vehicle door is held in the closed state after the vehicle occupant cancels the wearing of the seat belt while the vehicle occupant is less likely to withdraw the seat belt in order to wear the seat belt again when the vehicle door is opened. Therefore, the controller is adapted to perform the control of conducting the seat belt winding action (the seat belt storing action) only when the vehicle occupant is less likely to withdraw the seat belt in order to wear the seat belt again.

According to the first embodiment of the present invention relating to the seat belt storing control by the seat belt retractor, the electric motor can be used to conduct the seat belt winding action so as to reduce the risk of making the vehicle occupant uncomfortable as well as to prevent the seat belt from being kept in the unwound state. Therefore, this embodiment may provide a seat belt retractor capable of providing detailed control with regard to the seat belt winding action using the electric motor.

The second embodiment of the present invention can be a seat belt apparatus. The seat belt apparatus is an apparatus to be installed in a vehicle and can comprise at least a seat belt for occupant restraint, an electric motor, a spool, a controller, a seat belt buckle, a tongue, and a detection sensor. The seat belt for occupant restraint can be worn by a vehicle occupant. The spool may be capable of winding and unwinding the seat belt for occupant restraint according to the driving of the electric motor. The seat belt buckle can be fixed to the vehicle. The tongue may be attached to the seat belt and can be latched to the seat belt buckle when the seat belt is worn. The detection sensor can detect that the tongue is latched to the seat belt buckle. The controller for controlling the electric motor can perform a control mode in which the electric motor is controlled to rotate in a belt winding direction on the condition that, when it is determined that the wearing of the seat belt on a vehicle occupant is cancelled based on the information detected by the detection sensor, a vehicle door corresponding to the seat belt is changed from the closed state to the open state.

The seat belt is a long belt to be worn by a vehicle occupant seated in a seat and is sometimes called a "webbing." Typically, the vehicle occupant seated in the vehicle seat is restrained by the seat belt when restraint is required, such as during a vehicle collision. The seat belt buckle can be a member fixed to the vehicle. The tongue can be a member that is attached to the seat belt and can be latched to the buckle when the seat belt is worn by the vehicle occupant. The detection sensor can be a means for detecting that the tongue is inserted and latched to the buckle. The controller can be adapted to perform a control mode in which the electric motor is controlled to rotate in the belt winding direction on condition that, when it is determined that the wearing of the seat belt on a vehicle occupant is cancelled based on the information detected by the detection sensor, a vehicle door corresponding to the seat belt is changed from the closed state to the open state. The electric motor and the spool can have substantially the same functions as those of the seat belt retractor of the first embodiment.

According to the second embodiment relating to the seat belt storing control by the seat belt apparatus, the electric motor can be used to conduct the seat belt winding action so as to reduce the risk of making the vehicle occupant uncomfortable as well as to prevent the seat belt from being kept in the unwound state. Therefore, a seat belt apparatus capable of providing detailed control with regard to a seat belt winding action using the electric motor is provided.

The third embodiment of the present invention is a vehicle with a seat belt apparatus. In the vehicle of the third embodiment, the seat belt apparatus is accommodated in an accommodating space in the vehicle, such as an accommodating space in a pillar, an accommodating space in a seat, or an accommodating space in another part of the vehicle.

Accordingly, the third embodiment provides a vehicle in which a seat belt apparatus, capable of providing detailed control with regard to a seat belt winding action using the electric motor, is accommodated in an accommodating space in the vehicle.

As described in the above, the present disclosure may relate to the structure of a seat belt retractor for winding a seat belt for occupant restraint according to the driving of an electric motor. The present disclosure may provide a control mode in which an electric motor is controlled to rotate in the belt winding direction on the condition that the wearing of the seat belt on a vehicle occupant is cancelled and a vehicle door corresponding to the seat belt is changed from a closed state to an open state, thereby reducing the risk of making the vehicle occupant uncomfortable due to the seat belt winding action as well as preventing the seat belt from being kept in the unwound state.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Hereinafter, various embodiments of the present invention will be described in detail with reference to the drawings. First, description will be made in regard to embodiments of the present invention with reference to FIG. 1 and FIG. 2.

Figure 1:
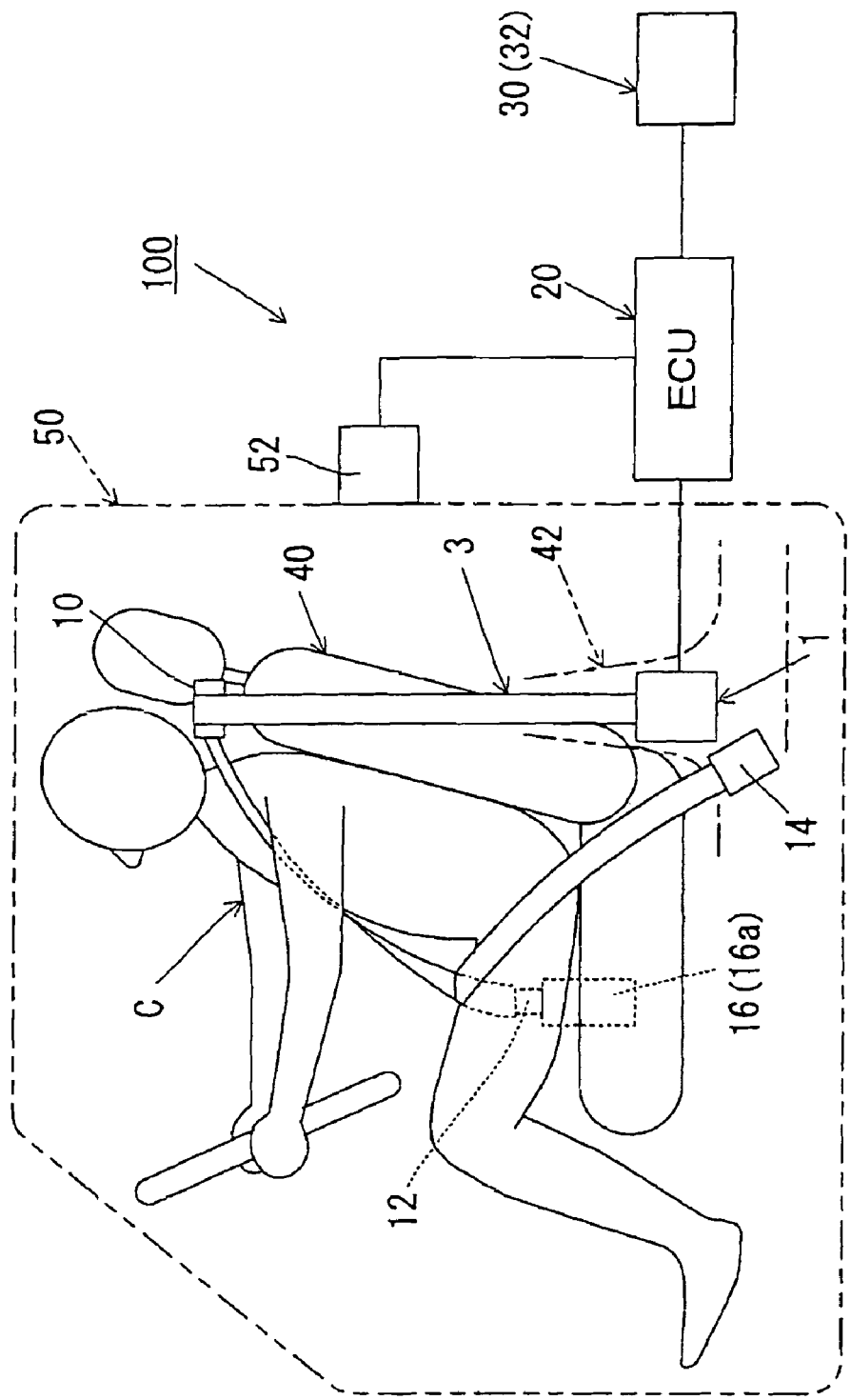
FIG. 1 shows a schematic structure of a seat belt apparatus according to an embodiment of the present invention.
Figure 2:
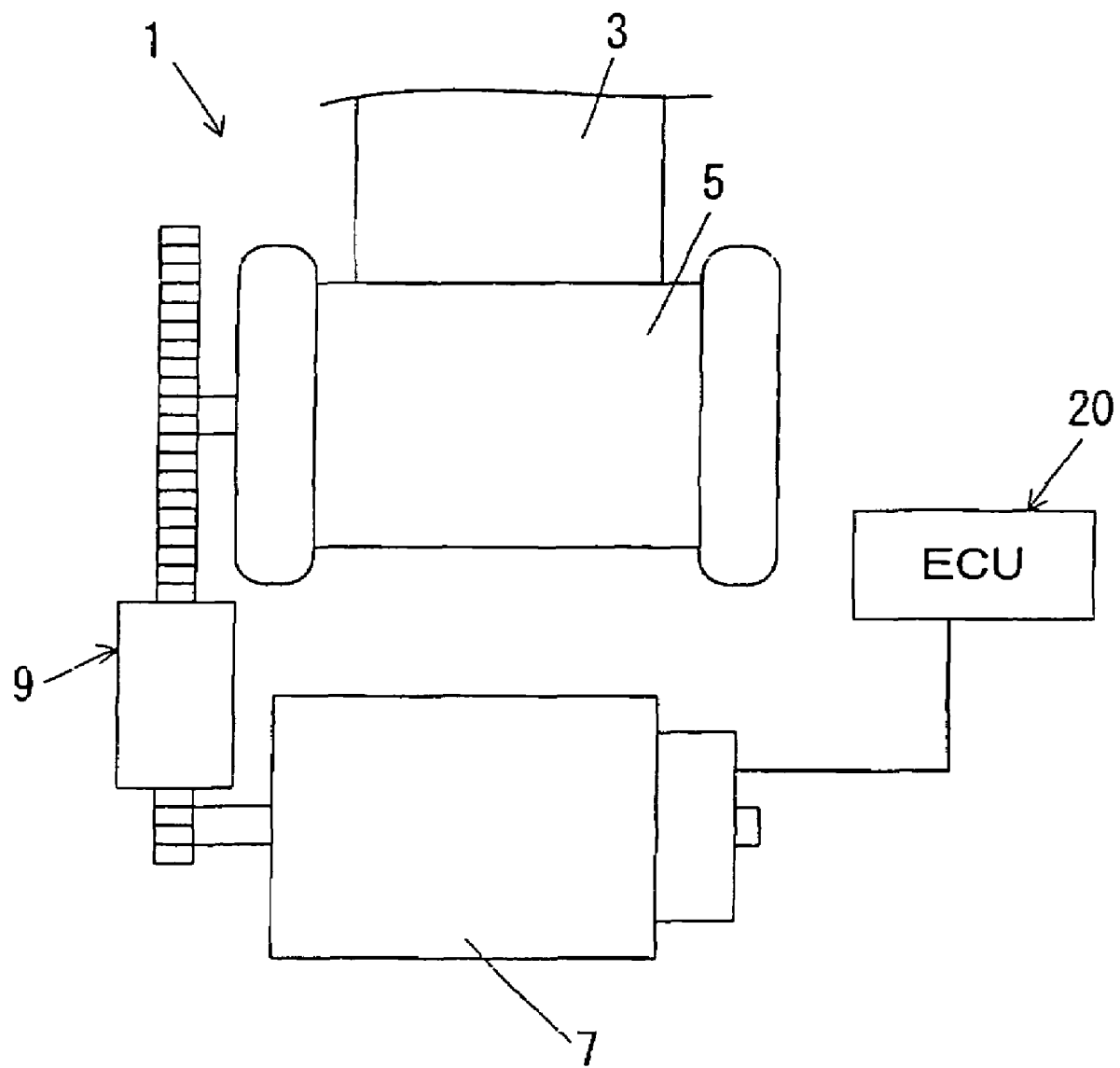
FIG. 2 shows a schematic structure of a seat belt retractor according to an embodiment of the present invention.

FIG. 1 shows a schematic structure a seat belt apparatus 100 according to an embodiment of the present invention. FIG. 2 shows a schematic structure of a seat belt retractor 1.

As shown in FIG. 1, the seat belt apparatus 100 is a seat belt apparatus for a vehicle to be installed in an automotive vehicle. The seat belt apparatus 100 can mainly comprise a seat belt retractor 1, a seat belt 3, a deflection fitting 10, a tongue 12, an outer anchor 14, a seat belt buckle 16, and an ECU 20. In addition, an input element 30 can be installed in the vehicle to detect various kinds of information and to input such detected information into the ECU 20. Such information can include information about a collision prediction or a collision occurrence of the vehicle, information about the driving state of the vehicle, information about the sitting position and the body size of a vehicle occupant seated in a vehicle seat, information about the traffic conditions around the vehicle, information about the weather condition and the time zone, and the like. The detected information of the input element 30 is transmitted to the ECU 20 anytime or at predetermined intervals and is used for the operational control of the seat belt apparatus 100 and the like.

The input element 30 can include a vehicle collision information detection sensor 32 for detecting information about a vehicle collision, such as a prediction of a vehicle collision or an occurrence of an actual vehicle collision. The vehicle collision information detection sensor 32 is a sensor capable of detecting (or measuring) information (or signals), such as the distance, the speed, and the acceleration of a collision object (such as a vehicle, an obstacle, a pedestrian, or the like) relative to the subject vehicle. The vehicle collision information detection sensor 32 is also capble of detecting (or measuring) the accelerations in the three-axial (X-axis, Y-axis, and Z-axis) directions acting on the subject vehicle. The vehicle collision information detection sensor 32 may be composed of a single detection sensor or a combination of a plurality of detection sensors. For example, a millimeter wave radar detector, a laser radar detector, an acceleration sensor, and/or a camera sensor may be used in the vehicle collision information detection sensor 32.

A vehicle door sensor 52 mounted on the vehicle can be adapted to detect the opening or closing state of a vehicle door 50. For example, a contact sensor comprising a first contact on the vehicle door side and a second contact on a vehicle pillar side may be employed as the vehicle door sensor 52. The contact sensor of this kind can detect the opening or closing of the vehicle door according to the contact between the first contact and the second contact. The vehicle door sensor 52 may be considered as a component of the seat belt retractor 1 or the seat belt apparatus 100. The information detected by the vehicle door sensor 52 is transmitted to the ECU 20 and can be used for the "retractor control process," as will be described later with regard to FIG. 3.

The seat belt 3 is a long belt (or webbing) to be used for restraining a vehicle occupant C (for example, a driver) seated in a vehicle seat 40 (for example, a driver's seat). The seat belt 3 can correspond to the "seat belt for occupant restraint" of the present disclosure. The seat belt 3 is withdrawn from the seat belt retractor 1 fixed relative to the vehicle and extends through a deflection fitting 10 provided around an area about the shoulder of the vehicle occupant C and is connected to an outer anchor 14 through a tongue 12. The deflection fitting 10 has a function of holding the seat belt 3 to the area about the shoulder of the occupant C and guiding the seat belt 3. By inserting the tongue 12 to a seat belt buckle 16 fixed to the vehicle body, the seat belt 3 goes into the state of being worn by the vehicle occupant C. The tongue 12 can correspond to the "tongue" of the present disclosure while the seat belt buckle 16 to which the tongue 12 can be latched can correspond to the "seat belt buckle" of the present disclosure.

The seat belt buckle 16 has a built-in buckle switch 16a. The buckle switch 16a detects that the tongue 12 is inserted into the seat belt buckle 16 so as to connect the seat belt to the seat belt buckle, i.e., it detects that the seat belt goes into the worn state). The information detected by the buckle switch 16a is transmitted to the ECU 20 which determines whether or not the seat belt 3 is in the worn state. The buckle switch 16a can correspond to the "detection sensor for detecting that the tongue is latched to the seat belt buckle" of the present disclosure.

The seat belt retractor 1 can be a device capable of performing the action of winding or unwinding the seat belt 3 via a spool 5 and a motor 7 as will be described later and can correspond to the "seat belt retractor" of the present disclosure. The seat belt retractor 1 can be installed in an accommodating space in a B-pillar 42 of the vehicle, as shown in the embodiment of FIG. 1.

The ECU 20 can have a function of conducting the control of the seat belt retractor 1 and other operational mechanisms based on the input signals from the input element 30. The ECU 20 can comprise a CPU (central processing unit), an input/output unit, a storage unit, a peripheral unit, and the like. The ECU 20 can control the motor 7, which will be described later, of the seat belt retractor 1. The ECU 20 can control the amount of current supplied to an electromagnetic coil of the motor 7 and the direction of the current supply so as to vary the rotational speed, the rotational direction, the rotational period of time, and the rotational torque (the output) of a shaft of the motor 7. The ECU 20 is structured as a means for controlling the driving of the motor 7 and controlling a power transmission mechanism 9, which will be described later, to switch between the state where the power of the motor 7 is transmitted to the spool 5 and the state where the power is not transmitted to the spool 5. The details will be described later. Further, the ECU 20 can also be provided with a function of detecting (or measuring) the current value of the motor 7 in operation. The ECU 20 can correspond to the "controller" of the present disclosure.

The ECU 20 may be exclusive to the seat belt retractor 1 or may be also used for controlling other systems, such as controlling a driving system and/or an electric system.

As shown in FIG. 2, the spool 5 can be formed in a columnar or cylindrical shape of which the outer periphery (or the seat belt contact face) functions as the wind-up surface on which the seat belt 3 is wound. The spool 5 is a member for performing the winding and unwinding actions of the seat belt 3 for occupant restraint according to the driving of the motor 7. The motor 7 can correspond to the "electric motor" of the present disclosure while the spool 5 can correspond to the "spool" of the present disclosure.

The power transmission mechanism 9 can be arranged between the spool 5 and the motor 7. The power transmission mechanism 9 is a mechanism capable of creating a connected state where the spool 5 and the motor 7 are connected (the power transmission operation mode) and a disconnected state where the connected state is cancelled (the power transmission disconnection mode). The power transmission mechanism 9 is sometimes referred to as a so-called "clutch," which comprises a combination of gears. The connected state of the power transmission mechanism 9 is a state where the power of the motor 7 is allowed to be transmitted to the spool via the power transmission mechanism 9. When the motor 7 is driven in this connected state, the power of the motor 7 is transmitted to the spool 5 via the power transmission mechanism 9. During the connected state, the rotational speed of the motor 7 is reduced by the power transmission mechanism 9. On the other hand, in the disconnected state of the power transmission mechanism 9, the physical connection between the spool 5 and the motor 7 is cancelled so as to allow the easy unwinding (or withdrawing) of the seat belt 3 from the spool 5. It should be noted that the spool 5 and the motor 7 may be directly connected without the power transmission mechanism 9 disposed between the spool 5 and the motor 7, if required.

In one embodiment, the power transmission mechanism 9 can be constructed as a so-called "single-stage clutch" (not shown). Accordingly, when the motor 7 is driven with a predetermined motor output in the power transmission operation mode of the power transmission mechanism 9, the rotation of the motor 7 is transmitted to the spool 5 with the rotational speed being reduced so that the spool 5 is driven to rotate with a predetermined torque at a predetermined rotational speed.

Alternatively, a power transmission mechanism capable of changing the rotational torque and the rotational speed of the spool into several stages may be employed. For example, a two-stage clutch capable of changing the rotational torque and the rotational speed of the spool into two stages may be employed. In this case, the power transmission mechanism can be set in a high-reduction ratio mode with a relatively high rotational torque and a relatively low rotational speed in order to respond to a need for the winding of the seat belt onto the spool with a large belt tension. On the other hand, the power transmission mechanism can be set in a low-reduction ratio mode with a relatively low rotational torque and a relatively high rotational speed in order to respond to a need for the rapid winding of the seat belt onto the spool.

The seat belt retractor 1 can have the following seven seat belt control modes of the seat belt 3. Based on these seat belt control modes, the control of the motor 7 and the power transmission mechanism 9 are performed by the ECU 20.

(1) Belt Storage Mode

The belt storage mode is a control mode in which the seat belt 3 is not used and fully wound onto the spool 5. In the seat belt retractor 1 in the belt storage mode, the motor 7 is not driven and the power transmission mechanism 9 is set to the power transmission disconnection mode. Therefore, only a very weak belt tension is applied to the seat belt 3 and the power consumption is zero.

(2) Belt Withdrawing Mode

The belt withdrawing mode is a control mode in which the seat belt 3 is withdrawn from the spool 5 so as to be worn by the occupant. The seat belt retractor 1 in the belt withdrawing mode is also set in the power transmission disconnection mode. Therefore, the seat belt 3 can be withdrawn with a small force. Also in this case, the motor 7 is not driven so that the power consumption is zero.

(3) Belt Winding and Fitting Mode

The belt winding and fitting mode is a control mode in which after the seat belt 3 is withdrawn and the tongue (for example, the tongue 12 in FIG. 1) is inserted into and latched with the seat belt buckle to turn ON the buckle switch (for example, the buckle switch 16a in FIG. 1), the excess part of the withdrawn seat belt 3 is wound up onto the spool in order to fit the seat belt 3 to the occupant. In addition, the belt winding and fitting mode is a control mode in which when the occupant moves so as to withdraw an amount of the seat belt 3 from the normally used state of the seat belt 3 (at this point, the buckle switch is in the ON state) and then the occupant returns to the original position, the withdrawn part of the seat belt 3 is wound up. In the seat belt retractor 1 in the belt winding and fitting mode, the motor 7 is driven to rotate at a high rotational speed in the belt winding direction and the power transmission mechanism 9 is set to the power transmission operation mode. Therefore, the seat belt 3 is rapidly wound onto the spool 5 and then the motor 7 is stopped when a very small predetermined belt tension is generated; thus the seat belt 3 is worn by and fitted to the occupant.

(4) Normal Wearing Mode

The normal wearing mode (or the comfortable mode) is a control mode in which the occupant wears the seat belt 3 in the normal state after the belt winding and fitting mode is terminated. In the seat belt retractor 1 in the normal wearing mode, the motor 7 is not driven and the power transmission mechanism 9 is set in the power transmission disconnection mode. Therefore, only a very weak belt tension is applied to the seat belt 3 so that the vehicle occupant can wear the seat belt 3 without any stress. In addition, the power consumption is zero.

(5) Warning Mode

The warning mode is a control mode in which when the driver dozes or an obstacle around the subject vehicle is detected with the seat belt being in the normal wearing mode, the seat belt 3 is wound repeatedly a predetermined number of times so as to warn the driver. In the seat belt retractor 1 in the warning mode, the motor 7 is controlled to be driven repeatedly. Therefore, the operation of alternately applying a relatively strong belt tension (but which is still weaker than the belt tension during the emergency mode, as will be described later) and a very weak belt tension onto the seat belt 3 is repeated, thus drawing the driver's attention to the fact that the driver is dozing or there is an obstacle around the vehicle.

(6) Emergency Mode

The emergency mode is a control mode, which is set when the subject vehicle is extremely likely to have a collision with an obstacle or the like during the normal wearing mode or following the aforementioned warning mode. In the seat belt retractor 1 in the emergency mode, the power transmission mechanism 9 is set in the power transmission operation mode and the motor 7 is controlled to rotate at a high rotational speed with a high rotational torque in the belt winding direction. The motor 7 is stopped when a predetermined extremely strong belt tension is generated on the seat belt 3 after the seat belt 3 is rapidly wound onto the spool 5, thus securely restraining the vehicle occupant with the seat belt 3.

(7) Belt Winding and Storing Mode

The belt winding and storing mode is a control mode in which the seat belt 3 is fully wound onto the spool 5 so as to be in the storage state. In the seat belt retractor 1 in the belt winding and storing mode, the power transmission mechanism 9 is set to the power transmission operation mode and the motor 7 is controlled to rotate in the belt winding direction. Accordingly, the withdrawn seat belt 3 is promptly wound onto the spool 5. The motor 7 is stopped when the seat belt 3 is fully wound and a predetermined belt tension, which is very weak, is developed. Thus, the seat belt 3 goes into the belt storage mode in which the aforementioned very weak belt tension is applied to the seat belt 3.

Figure 3:
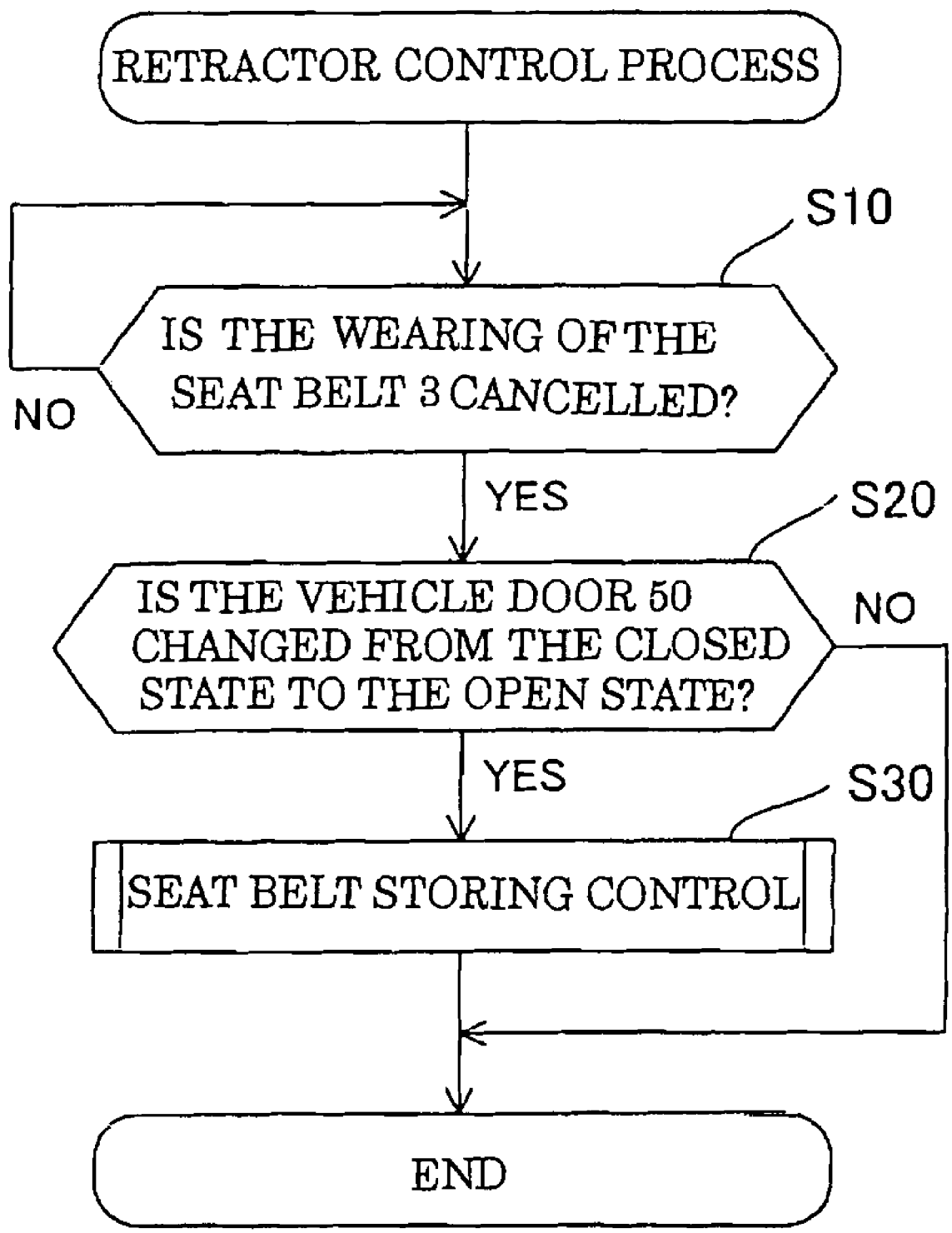
FIG. 3 shows a flow chart showing the retractor control process according to an embodiment of the present invention.

In reference to the belt winding and storing mode, a control is conducted such that the operation of storing the seat belt does not give the vehicle occupant any discomfort. The control is conducted according to, for example, a "retractor control process" (or seat belt storing control process) as shown in FIG. 3 by the controller (for, example, the ECU 20 in FIG. 1 or FIG. 2). The belt winding and storing mode can correspond to a "control mode" of the present disclosure.

FIG. 3 shows a flow chart of the retractor control process according to an embodiment of the present invention.

In the retractor control process shown in FIG. 3, in the step S10, it is determined whether or not the seat belt (for example, the seat belt 3 shown in FIG. 1) is changed from the worn state to the released state. For example, based on the information detected by the buckle switch 16a for detecting the insertion and latching of the tongue 12 to the seat belt buckle 16 shown in FIG. 1, it is determined that the seat belt 3 is changed from the worn state to the released state when the buckle switch 16a is changed from the ON state to the OFF state. This determination is achieved by the ECU 20, which detects the information from the buckle switch 16a. In the step S10, the process continues until the seat belt 3 is changed from the worn state to the released state and proceeds to the step S20 when it is determined that the seat belt 3 is changed from the worn state to the released state (the YES path in the step S10).

In the step S20, it is determined whether or not the vehicle door (for example, the vehicle door 50 shown in FIG. 1) is changed from the closed state to the open state. For example, based on the information detected by the vehicle door sensor 52 shown in FIG. 1, it can be determined that the vehicle door 50 is changed from the closed state to the open state when the vehicle door sensor 52 is changed from the ON state to the OFF state. This determination is achieved by the ECU 20, which detects the detected information from the vehicle door sensor 52. In the step S20, the process proceeds to the step S30 when it is determined that the vehicle door 50 is changed from the closed state to the open state (the YES path in step S20) and terminates if it does not (the NO path in step S20). That is, when the vehicle door 50 is held in the closed state, the seat belt retractor is controlled not to perform the seat belt storing control, as will be described later, such that the seat belt winding action by the motor 7 is not conducted.

In the step S30, the seat belt storing control is performed. In the seat belt storing control, the power transmission mechanism 9 of the seat belt retractor 1 is set in the power transmission operation mode and the motor 7 is driven to rotate in the belt winding direction. Therefore, the spool 5 is driven to rotate in the belt winding direction via the power transmission mechanism 9, whereby the seat belt 3 of which a part or all is withdrawn is wound onto the spool 5 so that the seat belt 3 goes into the stored state. The seat belt winding when the seat belt retractor is set in the belt winding and storing mode may be conducted only by the driving force of the motor 7 or by the winding force of an elastic member, such as a return spring which acts on the spool 5, with the driving force of the motor 7 as a secondary force.

If the seat belt retractor employs such a structure that the seat belt winding action is conducted based directly on the condition that the buckle releasing operation is performed by releasing the tongue from the seat belt buckle, the control may make the vehicle occupant uncomfortable when the vehicle occupant cancels the wearing of the seat belt but changes his or her mind and decides to wear the seat belt again. In this case, the vehicle occupant must withdraw the seat belt against the winding force of the seat belt winding action so as to experience discomfort.

In order to solve the above problem, the seat belt retractor 1 can have a control mode in which the seat belt winding action by the motor 7 is carried out on the condition that the vehicle door 50 is changed from the closed state to the open state after the buckle releasing operation is conducted, such as the step S20 as described above with reference to FIG. 3. This control mode is grounded in the idea that the vehicle occupant C is highly likely to withdraw the seat belt in order to wear the seat belt 3 again when the vehicle door 50 is held in the closed state after the vehicle occupant C cancels the wearing of the seat belt 3. Conversely, the vehicle occupant C is less likely to withdraw the seat belt 3 in order to wear the seat belt 3 again when the vehicle door 50 is opened. Therefore, the control of conducting the seat belt winding action (the seat belt storing action) is performed only when the vehicle occupant C is less likely to withdraw the seat belt 3 in order to wear the seat belt again.

According to the aforementioned embodiment of the seat belt storing control in the seat belt retractor 1, the motor 7 can be used to conduct the seat belt winding action so as to reduce the risk of making the vehicle occupant uncomfortable as well as to prevent the seat belt from being kept in the unwound state. Therefore, the present disclosure provides a seat belt retractor 1, a seat belt apparatus 100, and a vehicle with the seat belt apparatus 100 capable of providing detailed control with regard to seat belt winding action using a motor 7.

The present invention is not limited to the aforementioned embodiments but various variations and modifications may be made. For example, the following embodiment as a variation of the aforementioned embodiments may be carried out.

Although an embodiment has been described with regard to the seat belt retractor 1 being installed in an automobile, the seat belt retractor can be adapted to seat belt apparatuses to be installed in a vehicle for transferring one or more occupants, such as an automobile, an aircraft, a boat, a train, or a bus.

The priority application, Japanese Patent Application No. 2005-186767, filed on Jun. 27, 2005, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor to be installed in a vehicle comprising:
    an electric motor;
    a spool capable of winding and unwinding a seat belt for occupant restraint according to a driving of the electric motor; and
    a controller for controlling the electric motor,
    wherein the controller is configured to perform a control mode in which the electric motor is controlled to rotate in a belt winding direction based on a status of a wearing of the seat belt on a vehicle occupant and a status of a vehicle door corresponding to the seat belt, and
    wherein the controller is configured to perform a control mode in which the electric motor is controlled not to rotate in the belt winding direction when the wearing of the seat belt is cancelled and the vehicle door corresponding to the seat belt is either in a closed state or is not changed from a closed state to an open state.

2. The seat belt retractor according to claim 1, further comprising a transmission mechanism arranged between the spool and the motor.

3. The seat belt retractor according to claim 2, wherein the transmission mechanism is capable of a connected state in which the spool and the electric motor are connected and a disconnected state in which the spool and the electric motor are not connected.

4. The seat belt retractor according to claim 3, wherein the controller is configured to perform a control mode in which the transmission mechanism is placed in the connected state on condition that the wearing of the seat belt on the vehicle occupant is cancelled and the vehicle door corresponding to the seat belt is changed from the closed state to the open state.

5. The seat belt retractor according to claim 1, wherein the controller is configured to perform a control mode in which the electric motor is controlled to rotate in the belt winding direction on condition that the wearing of the seat belt on the vehicle occupant is cancelled and the vehicle door corresponding to the seat belt is changed from the closed state to the open state.

6. The seat belt retractor according to claim 1, wherein the controller is configured to perform a control mode in which the electric motor is controlled not to rotate in the belt winding direction when the vehicle door corresponding to the seat belt is not changed from the closed state to the open state.

7. The seat belt retractor according to claim 1, wherein the controller is configured to perform a control mode in which the electric motor is controlled not to rotate in the belt winding direction when the vehicle door corresponding to the seat belt is in the closed state.

8. A seat belt apparatus to be installed in a vehicle comprising:
- a seat belt for occupant restraint which is adapted to be worn by a vehicle occupant;
- an electric motor;
- a spool capable of winding and unwinding a seat belt for occupant restraint according to a driving of the electric motor;
- a controller for controlling the electric motor;
- a seat belt buckle fixed to the vehicle;
- a tongue attached to the seat belt and is configured to latch to the seat belt buckle when the seat belt is worn; and
- a detection sensor for detecting that the tongue is latched to the seat belt buckle,
- wherein the controller is configured to perform a control mode in which the electric motor is controlled to rotate in a belt winding direction based on a status of a wearing of the seat belt on the vehicle occupant and a status of a vehicle door corresponding to the seat belt, and
- wherein the controller is configured to perform a control mode in which the electric motor is controlled not to rotate in the belt winding direction when the wearing of the seat belt is cancelled and the vehicle door corresponding to the seat belt is either in a closed state or is not changed from a closed state to an open state.

9. The seat belt apparatus according to claim 8, wherein the controller is configured to perform a control mode in which the electric motor is controlled to rotate in the belt winding direction on condition that the wearing of the seat belt on the vehicle occupant is cancelled based on information detected by the detection sensor and that the vehicle door corresponding to the seat belt is changed from the closed state to the open state.

10. The seat belt apparatus according to claim 8, wherein the controller is configured to perform a control mode in which the electric motor is controlled not to rotate in the belt winding direction on condition that the wearing of the seat belt on the vehicle occupant is cancelled based on information detected by the detection sensor and that the vehicle door corresponding to the seat belt has not changed from the closed state to the open state.

11. The seat belt apparatus according to claim 8, wherein the controller is configured to perform a control mode in which the electric motor is controlled not to rotate in the belt winding direction when the vehicle door corresponding to the seat belt is in the closed state.

12. The seat belt apparatus according to claim 8, further comprising a contact sensor having a first contact adapted to be placed on the vehicle door and a second contact adapted to be placed on a vehicle pillar,
- wherein the controller is configured to process a signal from the contact sensor to determine the status of the vehicle door corresponding to the seat belt.

13. A vehicle with a seat belt apparatus comprising:
a seat belt apparatus comprising:
- a seat belt for occupant restraint which is adapted to be worn by a vehicle occupant;
- an electric motor;
- a spool capable of winding and unwinding the seat belt for occupant restraint according to a driving of the electric motor;
- a controller for controlling the electric motor;
- a seat belt buckle fixed to the vehicle;
- a tongue attached to the seat belt and is configured to latch to the seat belt buckle when the seat belt is worn; and
- a detection sensor for detecting that the tongue is latched to the seat belt buckle,
- wherein the controller is configured to perform a control mode in which the electric motor is controlled to rotate in a belt winding direction based on the status of a wearing of the seat belt on the vehicle occupant and the status of a vehicle door corresponding to the seat belt,
- wherein the seat belt apparatus is accommodated in an accommodating space in the vehicle, and
- wherein the controller is configured to perform a control mode in which the electric motor is controlled not to rotate in the belt winding direction when the wearing of the seat belt is cancelled and the vehicle door corresponding to the seat belt is either in a closed state or is not changed from a closed state to an open state.

14. The vehicle according to claim 13, further comprising a contact sensor having a first contact on the vehicle door and a second contact adapted to be placed on a vehicle pillar,
- wherein the controller is configured to process a signal from the contact sensor to determine the status of the vehicle door corresponding to the seat belt.

* * * * *